United States Patent [19]

Edwards et al.

[11] 4,076,999
[45] Feb. 28, 1978

[54] CIRCUIT FOR LIMITING THE SPINDLE SPEED OF A MACHINE

[75] Inventors: Clarence Roy Edwards, Stuartsdraft; Ellwood Donald Fickes, Waynesboro, both of Va.

[73] Assignee: General Electric Company, New York, N.Y.

[21] Appl. No.: 659,449

[22] Filed: Feb. 19, 1976

[51] Int. Cl.² ............................................. H02H 5/00
[52] U.S. Cl. .................................. 318/465; 318/449; 318/461; 318/565; 361/242
[58] Field of Search .......................... 361/51, 240, 242; 318/565, 461, 465, 102, 272, 309, 447, 449, 600, 601, 314; 340/62, 263, 262

[56] References Cited

U.S. PATENT DOCUMENTS

| 3,564,368 | 2/1971 | Kelling | 318/314 |
|---|---|---|---|
| 3,794,972 | 2/1974 | Van Ostrom | 340/62 |
| 3,891,046 | 2/1972 | Oicles | 361/242 |
| 3,941,202 | 3/1976 | Sorkin | 361/242 |

Primary Examiner—Robert K. Schaefer
Assistant Examiner—Michael K. Mutter

Attorney, Agent, or Firm—Stephen A. Young; Walter C. Bernkopf; Robert A. Cahill

[57] ABSTRACT

An apparatus for insuring that the rotational speed of a spindle on a machine is prevented from exceeding a selected programmed speed. The apparatus is comprised of means for continuously receiving pulsed signals indicative of the instantaneous rotational speed of the spindle over a timed cycle, wherein the cumulative signal within the receiving means at the end of each timed cycle is representative of the actual rotational speed of the spindle. The apparatus is further comprised of a first register for receiving a first signal representative of a selected desirable rotational speed of the spindle, a second register for receiving from the receiving means a second signal representative of a percentage of the actual rotational speed of the spindle after a lapse of the same percentage of the timed cycle, means for comparing the first signal with the second signal at the end of each timed cycle, and for generating a third signal each time the second signal is greater than the first signal, and means for generating a fourth signal after receiving a predetermined number of the third signals to disable the motor which drives the spindle.

3 Claims, 7 Drawing Figures

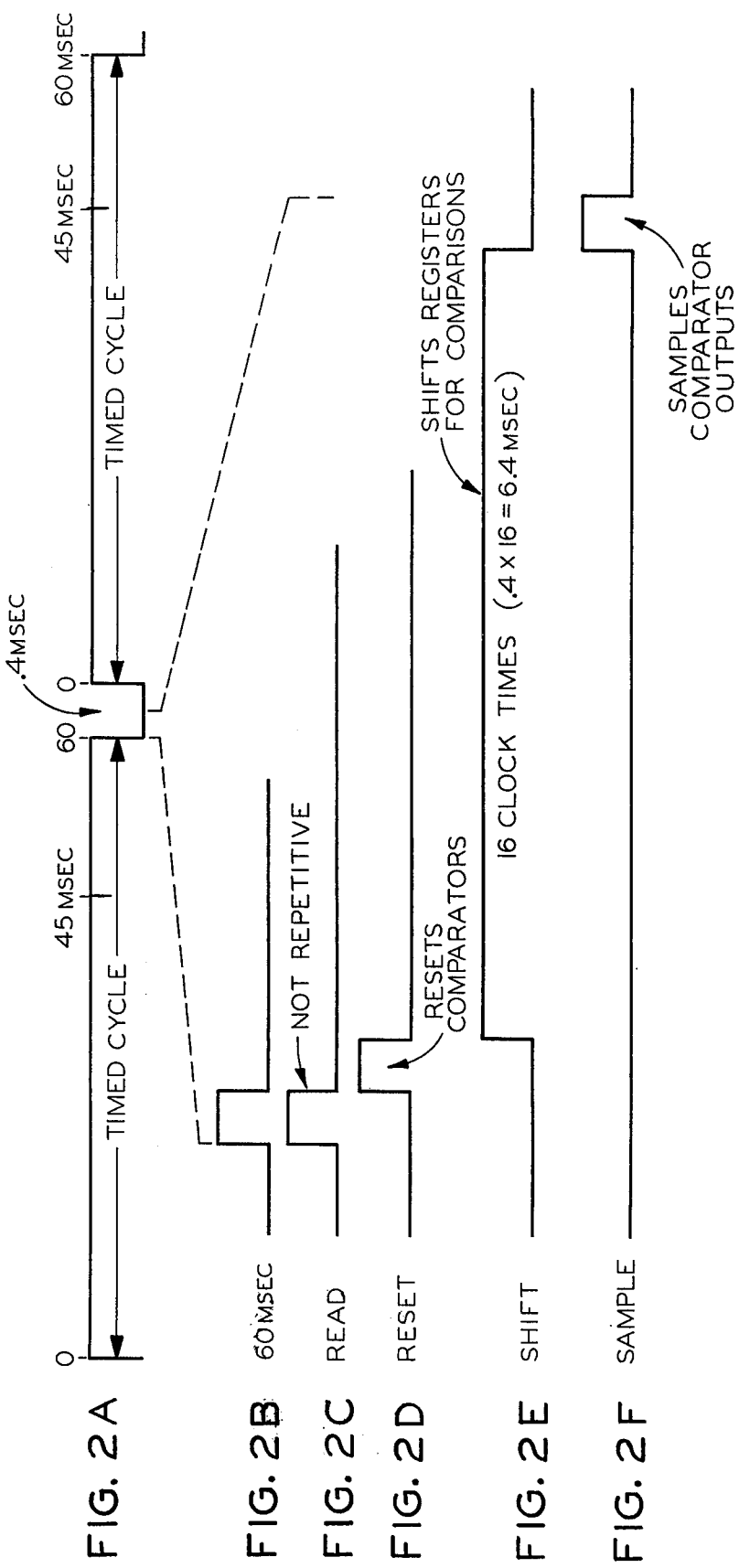

CIRCUIT FOR LIMITING THE SPINDLE SPEED OF A MACHINE

BACKGROUND OF THE INVENTION

1. Field of the Invention

This invention relates to a circuit for monitoring the spindle speed of a machine and for preventing a spindle from turning or spinning at a rate greater than a speed which has been selected as safe to operate at.

2. Description of the Prior Art

It has been found that in the operation of rotating machines, such as lathes, the spindle holding the work piece could operate or spin at an RPM greater than that which is determined as safe, whereby the work piece could actually fly off the spindle and the machine could be operating in a dangerous mode.

OBJECTS OF THE INVENTION

It would therefore be an object of this invention to insure that a spindle of a rotating machine would not be allowed to rotate at a speed greater than that which has been determined as safe by an operator.

It is another object of this invention to provide a digital readout of the current spindle speed of the machine.

It is a further object of this invention to allow the spindle to rotate faster than a selected speed during a programmed deceleration of the spindle.

This and other objects of the invention will be pointed out hereinafter.

SUMMARY OF THE INVENTION

According to a broad aspect of the invention, there is provided an apparatus for insuring that the rotational speed of a spindle on a machine is prevented from exceeding a selected programmed speed. The apparatus is comprised of means for continuously receiving pulsed signals indicative of the instantaneous rotational speed of the spindle over a timed cycle, wherein the cumulative signal within the receiving means at the end of each timed cycle is representative of the actual rotational speed of the spindle. The apparatus is further comprised of a first register for receiving a first signal representative of a programmed desired rotational speed of the spindle, a second register for receiving from the receiving means a second signal representative of a percentage of the actual rotational speed of the spindle after a lapse of the same percentage of the timed cycle, means for comparing the first signal with the second signal at the end of each timed cycle, and for generating a third signal each time the second signal is greater than the first signal, and means for generating a fourth signal after receiving a predetermined number of the third signals to disable a motor which drives the spindle.

According to one feature of the invention, the apparatus further provides a third register for receiving from the receiving means the cumulative signal representative of the actual rotational speed of the spindle after expiration of each timed cycle and before the commencement of the next timed cycle, and means for transferring the cumulative signal within the third register to a readout device to provide a visual indication of the actual rotational speed of the spindle.

According to another feature of the invention, the apparatus further comprises means for preventing generation of the fourth signal for a predetermined time after the first signal representative of the selected desired rotational speed of the spindle is received within the first register to avoid an unwanted disabling of a motor, which drives the spindle, within the predetermined time.

According to a still further feature of the invention, the apparatus further comprises a fourth register for receiving from the receiving means the cumulative signal from the receiving means representative of the actual rotational speed of the spindle only when the first signal representative of the selected desired rotational speed of the spindle is received within the first register, whereby the cumulative signal received within the fourth register is representative of the initial actual rotational speed of the spindle, and means for comparing the cumulative signal representative of the initial actual rotational speed of the spindle with the second signal, and for generating a fifth signal to de-activate the preventing means and enable the means for generating the fourth signal when the second signal is greater than the cumulative signal representative of the initial actual rotational speed of the spindle.

BRIEF DESCRIPTION OF THE DRAWING

FIG. 2A – 2F are timing diagrams showing the sequence of pulses generated by a timing pulse generator shown in FIG. 1.

DESCRIPTION OF THE PREFERRED EMBODIMENT

Figure 1:
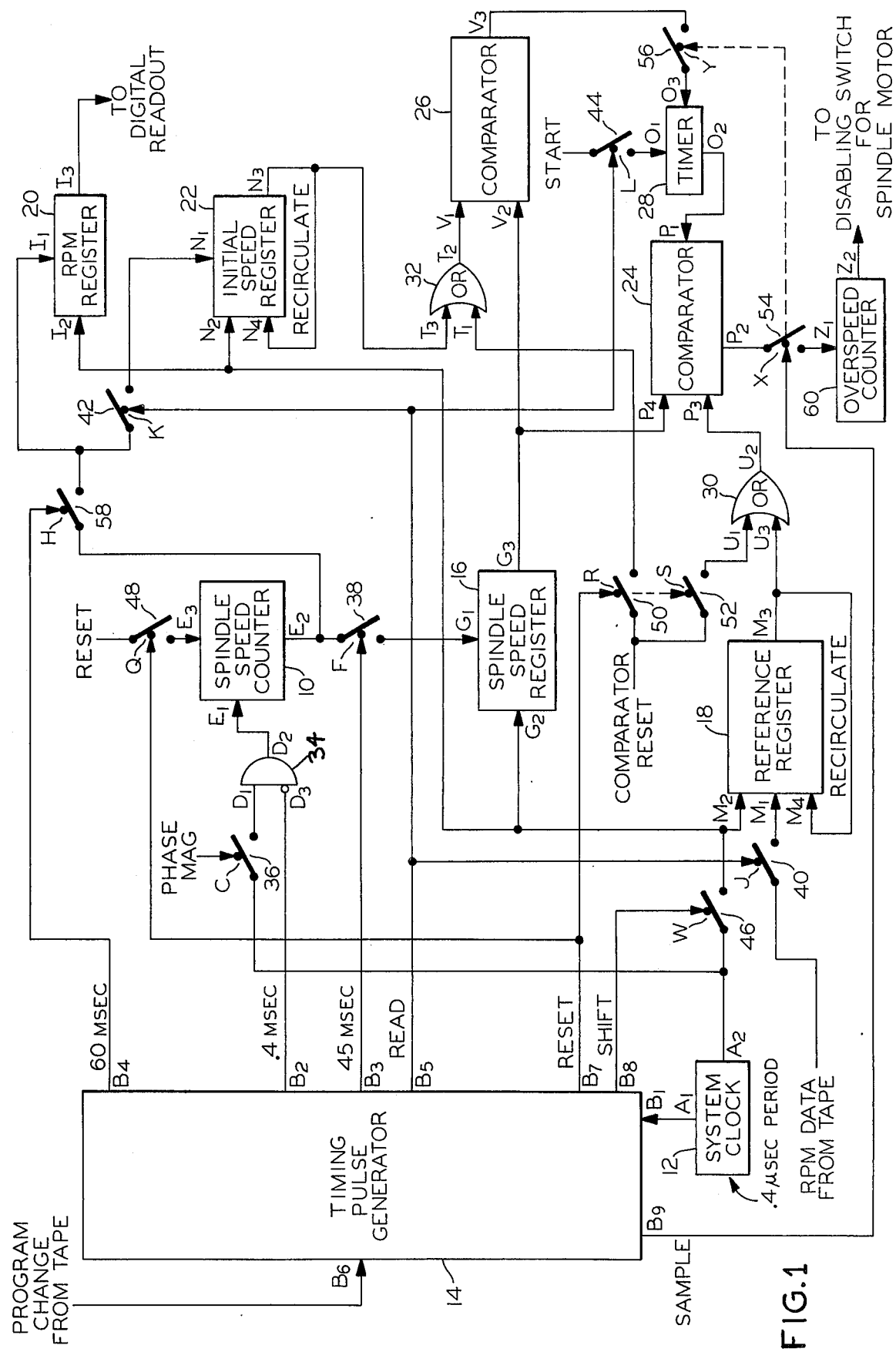
FIG. 1 is a block diagram describing the apparatus or circuit for monitoring and limiting the spindle speed of the machine in accordance with the invention.

Referring to FIG. 1 and FIGS. 2A – 2F, the invention will now be described.

As shown in FIG. 1, there is provided an apparatus for insuring that the rotational speed of a spindle on a machine (such as a lathe) can be limited so as not to exceed a predetermined selected speed. This apparatus is comprised of a spindle speed counter 10, which provides a means for continuously receiving pulsed signals that are indicative of the instantaneous rotational speed of the spindle over a timed cycle, wherein the cumulative signal within the spindle speed counter at the end of each timed cycle is representative of the actual rotational speed of the spindle. The apparatus is further comprised of a system clock 12, a timing pulse generator 14, first, second, third and fourth shift registers 16, 18, 20 and 22, respectively, comparators 24 and 26, a timer 28, OR gates 30 and 32, and inhibit gate 34, controlled switch means 36, 38, 40, 42, 44, 46, 48, 50, 52, 54, 56 and 58, and an overspeed counter 60. Each of the above controlled switch means can be provided by any appropriate electronic translating device, component or circuit which will allow a signal to pass therethrough when a control signal is applied to the control terminal of the switch means.

System clock 12 can be comprised of any standard clock oscillator which generates a periodic pulse. In this instance, clock 12 provides periodic pulses from its output terminals $A_1$ and $A_2$, wherein by way of example, these pulses can have a repetition rate of 0.4 microseconds. The clocked pulses produced by system clock 12 are applied directly from its output terminal $A_1$ to an input terminal $B_1$ of timing pulse generator 14. The clock pulses received at terminal $B_1$ of timing pulse generator 14 can typically be applied to an appropriate number of counter stages to establish an overall reference period of, for example, 60.4 milliseconds, from which reference period a number of critical timing pulses can be generated by using appropriate one-shot multi-vibrators and And gates, if necessary. A 0.4 millisecond duration blocking pulse can be generated, at an output terminal $B_2$ of the timing pulse generator, to terminate the overall reference period and to establish the above referred to timed cycle at 60 milliseconds in duration. As shown in FIG. 2A, a 0.4 microsecond duration pulse can be generated at an output terminal $B_3$ of timing pulse generator 14 every 45 milliseconds after the beginning of each timed cycle. As shown in FIG. 2B, a 0.4 microsecond duration pulse (hereinafter referred to as a 60 MSEC pulse) can be generated at an output terminal $B_4$ of timing pulse generator 14 60 milliseconds after the beginning and just after the end of each timed cycle. As shown in FIG. 2C, a 0.4 microsecond duration read pulse can be generated at an output terminal $B_5$ of timing pulse generator 14, 60 milliseconds after the beginning and just after the end of a timed cycle, only if a program change pulse is received at an input terminal $B_6$ of timing pulse generator 14 from a tape or other data input which indicates that a program change in the desired selected spindle speed is to be made. As shown in FIG. 2D, a 0.4 microsecond duration reset pulse can be generated at an output terminal $B_7$ of timing pulse generator 14 each cycle after the immediate termination of the 60 millisecond pulse shown in FIG. 2B. As shown in FIG. 2E, a shift enable pulse 6.4 microseconds in duration can be generated at an output terminal $B_8$ of timing pulse generator 14 each cycle immediately after the expiration of the reset pulse shown in FIG. 2D. As shown in FIG. 2F, a 0.4 microsecond duration sample pulse can be generated at an output terminal $B_9$ of timing pulse generator 14 each cycle immediately after the expiration of the shift enable pulse shown in FIG. 2E. Of course, it should be understood that the duration and occurence of the above referred to timing pulses are being shown by way of example only in order to aid in further understanding of the invention as it is being explained.

A phase magnitude (phase mag) pulse, the width of which varies as a function of the spindle speed, can be applied to a controlled input terminal C of controlled switch means 36 on a periodic basis. This phase mag pulse can be appropriately obtained from a phase change direction flip-flop 142, shown in U.S. Pat. No. 3,602,904. Whenever the phase mag pulse is applied to terminal C of switch means 36, the switch means closes and clock pulses from output terminal $A_2$ of system clock 12 pass through an input terminal $D_1$ and an output terminal $D_2$ of inhibitor gate 34, and into an input terminal $E_1$ of spindle speed counter 10, wherein each of the input pulses applied to input terminal $E_1$ is indicative of the instantaneous rotational speed of the spindle. At the end of the 60 millisecond timed cycle, the 0.4 millisecond duration pulse is applied from output terminal $B_2$ of timing pulse generator 14 to a control terminal $D_3$ of inhibitor 34 so as to prevent any further clock pulses from being applied to input terminal $E_1$ of the spindle speed counter, thereby defining the 60 millisecond timed cycle and the starting of the next timed cycle. Thus, at the end of each timed cycle, the cumulative signal within counter 10 represents the actual rotational speed of the spindle, wherein the signal can be either in binary or binary-coded decimal form. An advantage of making the timed cycles 60 milliseconds in duration derives from the fact that if only one 0.4 microsecond duration phase mag pulse is applied to switch means 36 over one complete timed cycle, only one clock pulse would be applied to input terminal $E_1$ of counter 10, and the count within the spindle speed counter would be effectively equivalent to 1 RPM.

Inasmuch as the spindle speed does not change significantly during the course of a single timed cycle, the number of pulses received at input $E_1$ of spindle speed counter 10 generally are relatively evenly spaced throughout the course of the timed cycle. Thus, the cumulative signal within spindle speed counter 10 over the course of any percentage of the timed cycle would be representative of the same percentage as the actual spindle speed. With this in mind, by applying the pulse from output terminal $B_3$ of timing pulse generator 14 to a controlled terminal F of switch means 38, 45 milliseconds after the start of the timed cycle (i.e. after a lapse of 75% of the timed cycle), switch means 38 will close and the thus far cumulative signal within the spindle speed counter will be transmitted in parallel from a parallel output terminal $E_2$ (representative of all flip-flop outputs of the counter) to a parallel input $G_1$ of spindle speed register 16, whereby the signal within spindle speed register 16 in this instance is representative of the same 75% of the actual rotational speed of the spindle. Thus, it can be observed that by varying the timing of the pulse applied to control terminal F of switch means 38 to control the percentage of the lapsed portion of the timed cycle, the cumulative signal representative of the same percentage of the actual rotational speed of the spindle can vary, and this percentage can vary over any convenient range, for example, from less than 50% to 100% of the actual rotational speed of the spindle.

At the end of the timed cycle, the 60 msec pulse, shown in FIG. 2B, is applied to a control terminal H of controlled switch means 58, so as to close controlled switch means 58 and allow the transmission of the cumulative signal indicative of the actual rotational speed of the spindle from a parallel output terminal $E_2$ of spindle speed counter 10 to register 20 via its parallel input terminal $I_1$, so that at the end of each timed cycle, the signal within register 20 is always indicative of the actual rotational speed of the spindle at that moment.

If a change in the spindle speed is desired, a program change pulse can be applied from a tape to input terminal $B_6$ of timing pulse generator 14 to cause the previously described read pulse shown in FIG. 2C to be generated on a one-shot non-repetitive basis at output terminal $B_5$ at the end of the previous timed cycle and simultaneously with the 60 msec pulse. As a matter of fact, the read pulse can be generated by applying the program change pulse for a duration of 60.4 milliseconds to a control terminal of a controlled switch means (not shown) and have the main output terminals of the controlled switch means connected between terminals $B_4$ and $B_5$ of timing pulse generator 14. The read pulse is applied simultaneously to respective control terminals J, K and L of respective controlled switch means 40, 42 and 44 so as to close each of these respective controlled switch means for the duration of the read pulse interval. When switch means 40 is closed, a signal which is indicative of the desired selected programmed rotational speed of the spindle is applied from a data source such as a tape to a parallel input terminal $M_1$ of reference register 18. When controlled switch means 42 is closed, controlled switch means 58 will also be closed inasmuch as the read pulse and the 60 msec pulses, shown in FIGS. 2B and 2C, occur simultaneously, and the cumulative signal representative of the actual rotational speed of the spindle will be transmitted from parallel output terminal $E_2$ of spindle speed counter 10 to a parallel input terminal $N_1$ of register 22. The signal stored within register 22 will thus be representative of the initial speed of the spindle at the time that the new desired spindle speed is being programmed. Similarly, when switch means 44 closes, a start pulse (i.e. voltage level) is transmitted to an input terminal $O_1$ of timer 28. Timer 28 can be a standard one-shot such as a monostable multi-vibrator, which will produce a pulse at its output terminal $O_2$ for a predetermined duration of time after the application of the start pulse to input terminal $O_1$. This duration could typically be approximately 10 seconds or whatever time is usually necessary for a spindle to reach a steady state rotational velocity after a new spindle speed has been programmed. The output pulse from timer 28 is applied from terminal $O_2$ to an input terminal $P_1$ of comparator 24, and is used in any standard well-known manner to inhibit the comparator from producing an output signal at its output terminal $P_2$ for the 10 second duration of the timer output pulse. The reason for doing this will soon become apparent. Again, it should be emphasized that reference register 18 receives a new desired programmed signal, initial speed register 22 receives a signal indicative of an initial speed of the spindle and timer 28 is activated on a one-shot non-repetitive basis, only when a read pulse is produced indicating that a new desired spindle speed is to be programmed.

As the read and 60 msec pulses (shown in FIGS. 2C and 2B respectively) extinguish, a reset pulse shown in FIG. 2D is generated from output terminal $B_7$ of timing pulse generator 14. This reset pulse is applied to respective control terminals Q, R and S of respective controlled switch means 48, 50 and 52, which causes the respective controlled switch means to close. Upon closure of controlled switch means 48, a reset signal (i.e. voltage level) is applied to a reset input terminal $E_3$ to reset the spindle speed counter 10 for the next timed cycle. At the same time, when switch means 50 and 52 are closed, a comparator reset signal (i.e. voltage level) is applied through respective switch means 50 and 52 and through respective input terminals $T_1$ and $U_1$ of respective OR gates 32 and 30 to respective reset input terminals $V_1$ and $P_3$ of respective comparators 26 and 24. This is to insure that comparators 26 and 24 will be in a reset position, and thus in a mode to begin to compare signals which will be applied to respective reset and set input terminals of the comparators.

Upon expiration of the reset pulse shown in FIG. 2D, a shift enable pulse shown in FIG. 2E is applied from output terminal $B_8$ of timing pulse generator 14 to a control terminal W of controlled switch means 46. For the duration of the shift enable pulse, controlled switch means 46 will be closed, and clock pulses from system clock 12 are applied to respective shift input terminals $M_2$, $G_2$, $N_2$ and $I_2$ of respective registers 18, 16, 22 and 20. In this instance, the shift enable pulse can be 6.4 microseconds in duration to allow 16 clock pulses to pass through switch means 46 if the maximum number of bits within each register is 16. The clock pulses applied to terminal $I_2$ of register 20 will enable the digital signal within register 20 to be serially transmitted from its serial output terminal $I_3$ to a digital readout device (not shown) so as to provide a continuous visual readout of the actual spindle speed on a cyclical basis. Similarly, the clock pulses cause the digital signal representative of a percentage of the actual spindle speed stored within register 16 to be serially transmitted from its serial output terminal $G_3$ to respective set input terminals $V_2$ and $P_4$ of respective comparators 26 and 24. At the same time, the clock pulses are serially shifting the digital signals stored within registers 18 and 22 from their respective serial output terminals $M_3$ and $N_3$ to respective input terminals $U_3$ and $T_3$ and out through respective output terminals $U_2$ and $T_2$ of respective OR gates 30 and 32 to respective reset input terminals $P_3$ and $V_1$ of respective comparators 24 and 26. At the same time, the output signals from respective registers 18 and 22 are recirculated back in through respective serial input terminals $M_4$ and $N_4$ in order that the signal information within these registers may be preserved and stored for the next cycle of the operation.

Comparator 24, which can be a standard set-reset flip-flop, provides a serial comparison between each of the bits of the signals within reference register 18 and register 16, wherein the respective less significant bits are compared before the respective more significant bits. Meanwhile, comparator 26, which can also be a standard set-reset flip-flop, provides a similar serial comparison between each of the bits of the signals within initial speed register 22 and register 16. If the digital signal within reference register 18 is greater than the digital signal within spindle speed register 16, the signal at output terminal $P_2$ of comparator 24 would be at a reset (i.e. zero) voltage level at the end of the shift cycle defined by the duration of the shift enable pulse. However, if the signal within spindle speed register 16 is greater than the signal within reference register 18, the signal at output terminal $P_2$ of comparator 24 will be at a set (i.e. one) voltage level at the end of the shift cycle. Similarly, if the digital signal within initial speed register 22 were greater than the digital signal within spindle speed register 16, the output signal at output terminal $V_3$ of comparator 26 would be at a reset (i.e. zero) voltage level at the end of the shift cycle, and if the digital signal within spindle speed register 16 were greater than the digital signal within initial speed register 22, then the output signal at output terminal $V_3$ of comparator 26 at the end of the shift cycle would be at a set (i.e. one) voltage level. Inasmuch as the signal within the spindle speed register is only equal to a percentage of the actual rotational speed of the spindle (in this instance, 75% of the actual rotational speed of the spindle) comparators 24 and 26 would only have a set (i.e. one) output signal present at the end of respective shift cycle when the actual spindle speed is greater than 133% of the selected desired programmed speed and the initial spindle speed, respectively. It should be clear that in order to provide a set output from either of comparators 24 and 26 whenever the actual spindle speed is greater than the respective programmed desired spindle speed and the initial spindle speed, the percentage of the actual spindle speed within register 16 would have to be 100%, and controlled switch means 38 would have to be closed by the 60 msec pulse shown in FIG. 2B.

After the termination of the shift enable pulse, a sample pulse (shown in FIG. 2F) is applied from output terminal $B_9$ of timing pulse generator 14 to respective control terminals X and Y of respective controlled switch means 54 and 54 so as to close respective controlled switch means 54 and 56. When switch means 54 closes and no output signal appears at output terminal $O_2$ of timer 28, if a set voltage level signal appears at output terminal $P_2$ of comparator 24, this set voltage level will be transmitted through closed switch means 54 to an input terminal $Z_1$ of overspeed counter 60. The received signal or pulse within counter 60 provides an indication that through one operating timed cycle, the actual spindle speed is greater than 133% of the desired spindle speed (if the percentage of the actual spindle speed within spindle speed register 16 is intentionally set at 75%), and one overspeed count is stored within counter 60. If one desires that, upon the appearance of a single overspeed signal, the spindle motor is to be disabled, then this counter will provide an immediate output pulse from its output terminal $Z_2$ to an emergency stop switch (not shown) that will disable the spindle motor. However, if it is desired instead that a predetermined number of overspeed pulses must first be received within counter 60 before the spindle motor will be disabled, then the counter could require, by way of example only, that at least four overspeed signals be received over four separate timed cycles before counter 60 would provide an output signal to disable the spindle motor. While the predetermined number of overspeed pulses necessary to disable the spindle motor is described above as being either one or four in number, it should be understood that this predetermined number can vary between one and four, or, if desired, can be greater than four.

As indicated before, if following a timed cycle, a read pulse were initiated, then timer 28 would generate an inhibit pulse of, for example, 10 seconds in duration. This inhibit pulse would insure that comparator 24 would be disabled for 10 seconds, and no overspeed signals would be applied to counter 60. This inhibit function is provided, because it is possible that the desired program signal applied to reference register 18 could be intentionally selected to be considerably less than the actual rotational speed of the spindle, in this instance, less than 75% of the actual rotational speed, when the spindle is being programmed for deceleration. Thus, unless the output of comparator 24 were inhibited for the 10 second time period, unwanted overspeed pulses would be applied to counter 60, and the spindle motor would soon be disabled. Therefore, by utilizing the inhibit output signal from timer 28, the spindle is given a chance to reach a steady state rotational velocity after a new desired spindle speed is programmed to prevent the circuit or apparatus from unwittingly interfering with the continuous and proper operation of the machine.

However, if the spindle is programmed for acceleration and the new desired reference signal is greater than the actual spindle speed, then the danger of an erroneous overspeed indication, that would be present when the spindle is programmed for deceleration, would not exist. Therefore, under these circumstances, it would still be desirable to have comparator 24 operative to provide overspeed indications to counter 60 even immediately after the new desired higher spindle speed is programmed. Comparator 26 serves this function as follows.

When the signal within spindle speed register 16 is greater than the signal within initial speed register 22 within the (10 second) predetermined time interval after a new desired spindle speed has been programmed, the signal at output $V_3$ of comparator 26 at the end of the shift cycle is at the one voltage level, thereby providing an indication that the spindle has been programmed for an acceleration over its initial speed. During the next sampling interval, when switch 56 is closed, the set signal from output terminal $V_3$ of comparator 26 is transmitted through switch means 56 to an input reset terminal $O_3$ of the timer 28. This causes the one-shot to reset and the output of timer 28 to return to a zero or non-inhibit level for the remainder of the 10 second interval. In turn, comparator 24 is no longer inhibited, and sensed overspeed signals generated by comparator 24 can be used to cause the spindle motor to be disabled.

In conclusion, during ordinary operation of the machine, when no new spindle speed has been programmed over a previous predetermined (10 second) interval, overspeed signals can be generated by comparator 24 after each timed cycle before the commencement of the next timed cycle to cause de-activation of the motor which drives the spindle. Similarly, during an initial (10 second) interval after a new desired spindle speed is programmed, the comparator will ordinarily be disabled, if the new desired spindle speed is substantially less than the initial actual spindle speed. However, if the new desired programmed spindle speed is greater than the initial actual spindle speed, any acceleration or increase in the actual spindle speed over the initial spindle speed, which is sensed at the output of comparator 26, will cause re-activiation of comparator 24 during the remainder of the predetermined (10 second) interval.

Although the invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. Apparatus for insuring that the rotational speed of a spindle on a machine is prevented from exceeding a selected speed, comprising:
   a. means for continuously receiving pulsed signals indicative of the instantaneous rotational speed of the spindle over a timed cycle, wherein the cumulative signal within said receiving means at the end of each timed cycle is representative of the actual rotational speed of the spindle;
   b. a first register for receiving a first signal representative of a selected desired rotational speed of the spindle;
   c. a second register for receiving from said receiving means a second signal representative of a percentage of the actual rotational speed of the spindle after a lapse of the same percentage of the timed cycle;
   d. means for comparing the first signal with the second signal at the end of each timed cycle, and for generating a third signal each time the second signal is greater than the first signal;
   e. means for generating a fourth signal after receiving a predetermined number of third signals to disable a motor which drives the spindle; and
   f. means for preventing generation of the fourth signal for a predetermined time after the first signal representative of the selected desired rotational speed of the spindle is received within said first register to avoid an unwanted disabling of the motor, which drives the spindle, within the predetermined time.

2. An apparatus according to claim 1, further comprising:
   a. a third register for receiving from said receiving means the cumulative signal representative of the actual rotational speed of the spindle after the expiration of each timed cycle and before the commencement of the next timed cycle; and b. means for transferring the cumulative signal within said third register to a readout device to provide a visual indication of the actual rotational speed of the spindle.

3. An apparatus according to claim 1, further comprising:

a. a fourth register for receiving from said receiving means the cumulative signal from said receiving means representative of the actual rotational speed of the spindle only when the first signal representative of the selected rotational speed of the spindle is received within said first register, whereby the cumulative signal received within said fourth register is representative of the initial actual rotational speed of the spindle; and b. means for comparing the cumulative signal representative of the initial actual rotational speed of the spindle with the second signal, and for generating a fifth signal, to de-activate said preventing means and enable said means for generating a fourth signal when the second signal is greater than the cumulative signal representative of the initial actual rotational speed of the spindle.

* * * * *